United States Patent [19]

Klein et al.

[11] 4,186,255
[45] Jan. 29, 1980

[54] BIS-QUATERNARY AMMONIUM SALTS AS POLYISOCYANURATE CATALYSTS

[75] Inventors: Howard P. Klein, Houston; George P. Speranza, Austin, both of Tex.

[73] Assignee: Texaco Development Corporation, White Plains, N.Y.

[21] Appl. No.: 886,210

[22] Filed: Mar. 13, 1978

[51] Int. Cl.² ............... C08G 18/16; C08G 18/14; C07C 87/30
[52] U.S. Cl. .................. 521/128; 260/501.15; 252/426; 252/438; 521/902; 528/52
[58] Field of Search ............ 260/2.5 AC, 2.5 AW, 260/501.15, 77.5 AC; 521/128, 902; 252/438, 426; 528/52

[56] References Cited

U.S. PATENT DOCUMENTS

| | | | |
|---|---|---|---|
| 2,759,975 | 8/1956 | Chiddix | 260/501.15 |
| 2,876,263 | 3/1959 | Mark | 260/501.15 |
| 3,010,963 | 11/1961 | Erner | 260/2.5 AC |
| 3,223,718 | 12/1965 | Scherr | 260/501.15 |
| 3,576,873 | 4/1971 | Crounse | 260/501.15 |
| 3,892,687 | 7/1975 | Bechara | 260/2.5 AW |
| 3,954,684 | 5/1976 | Farrissey | 260/2.5 AC |
| 3,980,594 | 9/1976 | Fabris | 260/2.5 AC |
| 4,040,992 | 8/1977 | Bechara | 260/2.5 AW |

Primary Examiner—H. S. Cockeram
Attorney, Agent, or Firm—Carl G. Ries; Thomas H. Whaley; James L. Bailey

[57] ABSTRACT

Covers the use of quaternary ammonium carboxylate salts as polyisocyanurate catalysts. Said catalysts are useful in promoting the reaction between a polyol and an aromatic polyisocyanate to prepare a polymer containing recurring isocyanurate and urethane linkages.

15 Claims, No Drawings

BIS-QUATERNARY AMMONIUM SALTS AS POLYISOCYANURATE CATALYSTS

BACKGROUND OF THE INVENTION

1. Field of the Invention

This invention relates to the preparation of polyisocyanurate polymers such as polymer foams, and is more particularly concerned with use of a class of catalyst which promote the trimerization of polyisocyanates to polyisocyanurate polymers.

2. Description of the Prior Art

Polyisocyanurate polymers such as rigid polyisocyanurate foams are known in the art. The prior art discloses methods for preparing such polymers by reacting an organic polyisocyanate with a polyol utilizing a polyisocyanurate group formation catalyst. Foams are prepared by effecting such reaction in the presence of a blowing agent. In the optimum situation the isocyanurate catalyst utilized promotes formation of both isocyanurate linkages and urethane linkages to produce urethane-modified polyisocyanurate polymers. See, for example, U.S. Pat. Nos. 3,516,950; 3,580,868; 3,620,986; 3,625,872; 3,635,848; 3,725,319; and 3,745,133.

In particular, the use of quaternary ammonium compounds such as quaternary ammonium hydroxides, alkoxides, and aryl oxides such as phenoxides are disclosed as useful catalysts in reactions involving organic isocyanates, such as in the formation of polyisocyanurates, polyurethanes and polyurethane-polyisocyanurate resins. Representative art includes, for example, German Offen. No. 2,527,241; U.S. Pat. Nos. 2,779,689; 2,981,700; 3,726,816; 3,010,963; 3,108,975; 3,954,684; 3,892,687; 3,928,256; 3,933,699; and 3,980,594 and U.S. published patent application Nos. B 497,194 and B 490,946.

It has been found here, however, that the use of the above quaternary compounds, particularly in preparing urethane-modified polyisocyanurate polymers have a number of drawbacks. The hydroxides and alkoxides particularly in many instances promote too rapid a reaction, leading to problems of control in preparing the polymers. In other instances, catalysts of this type are not sufficiently heat stable and/or, are relatively incompatible in the polymer-forming systems used. Again, catalysts of this type in some instances are difficult to prepare and their use then becomes somewhat uneconomical. Lastly, many prior art catalysts of this type do not produce the desired high concentration of isocyanurate linkages in the polymer unless relatively large amounts of catalysts are used, and in many cases even use of such high amounts of catalyst does not achieve the desired aim of a polymer containing substantial numbers of isocyanurate linkages.

We have now discovered that these and other drawbacks of prior art catalysts have been overcome by resort to the particular class of polyisocyanurate catalysts defined here.

SUMMARY OF THE INVENTION

This invention comprises a novel process for preparing a polymer containing recurring isocyanurate and urethane linkages, which polymer comprises a reaction product of a polyol and an aromatic polyisocyanate utilizing as a isocyanurate formation catalyst a particularly useful specific class of compounds.

These compounds believed also to be novel comprise quaternary ammonium carboxylate salts which include compounds falling within the following structural formula:

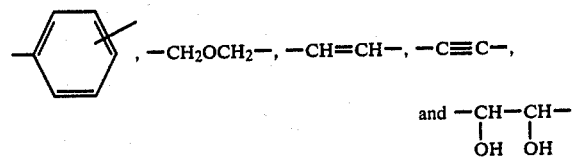

where $R_1$, $R_2$ and $R_3$ individually are radicals selected from the group consisting of alkyl, or substituted alkyl, $R_4$ is a radical substituted from the group consisting of alkyl, substituted alkyl or hydrogen, R is a radical selected from the group consisting of $-(CH_2)_x-$,

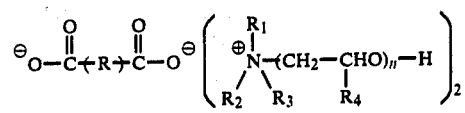

where x is a number of from 0 to 20 and n is a number of from 1 to 4.

DETAILED DESCRIPTION OF THE INVENTION

The compounds discovered here are useful polyisocyanurate catalysts. They may be prepared via a number of conventional routes. One particularly useful mode of preparation involves reaction of a tertiary amine, a dicarboxylic acid and an oxide such as propylene oxide or ethylene oxide or a mixture of propylene and ethylene oxides. Usually this procedure is carried out by adding the dicarboxylic acid such as oxalic acid to an aqueous solution of tertiary amine followed by reaction of the resultant product mixture with a compound containing an oxide group. The resultant quaternary ammonium carboxylate can be isolated from the reaction mixture by conventional techniques such as vacuum stripping off of by-product materials. The resultant product may be used in crude form or further refined to give a substantially pure product.

Any tertiary amine may be used here which contains the radicals $R_1$ and $R_2$ and $R_3$ individually as set out above. Preferably, said radicals $R_1$, $R_2$, and $R_3$ contain 1-18 carbon atoms, and most preferably are lower alkyl radicals such as ethyl, methyl, isopropyl, butyl, t-butyl, etc. When lower alkyl, these R groups normally contain 1-4 carbon atoms. Thus, representative tertiary amines useful here include, trimethylamine, triethylamine, tripropylamine, triisopropylamine, butyldimethylamine, octyldimethylamine, dodecyldimethylamine, stearyldimethylamine, cetyldimethylamine, distearylmethylamine, dioctylethylamine, tri-t-butylamine.

When $R_1$, $R_2$ and $R_3$ are substituted in one or more occurrences they may be substituted with a number of radicals of varying types, as long as said radicals do not interfere with the reaction of the tertiary amine with dicarboxylic acid and oxide. Thus, said groups may be substituted with one or more halo, nitro, cyano, alkyl, and particularly lower alkyl, etc., groups.

The above tertiary amines or others are reacted with a wide variety of dicarboxylic acids. Likewise, derivatives of these dicarboxylic acids, such as lower alkyl esters (preferably one containing 1-4 carbon atoms in the alkyl group derived from the alcohol) and anhydrides may be employed.

Typical dicarboxylic acid reactants normally will contain 2–18 carbon atoms, and more often contain 4–12 carbon atoms. These reactants include such dibasic acids as adipic, azelaic, sebacic, isophthalic and terephthalic acids, phthalic and succinic anhydrides, dimethyl terephthalate esters, oxydiacetic acid, fumaric acid, oxalic acid, maleic acid, suberic acid, pimelic acid, glutaric acid, malonic acid, diethylmalonic acid, dimethylmalonic acid, di-n-propylmalonic acid, ethylmalonic acid, ethyl-n-propylmalonic acid, etc.

The oxide reactant which reacts with the tertiary amine in presence of the dicarboxylic acid may also be chosen from a wide variety of oxides.

Examples of typical oxides useful here include ethylene oxide, 1,2-epoxypropane, isobutylene oxide, 1,2-epoxybutane, 2,3-dimethyl-2,3,-epoxybutane, 2-methyl-2,3-epoxypentane, 1,2-epoxyheptane, 5-methyl-1,2-epoxyhexane 3,4-epoxyheptane, styrene epoxide, 1-cyclohexylepoxyethane, 2-methyl-1,2-epoxyheptane, 1,2-epoxyoctane, 2,4,4-trimethyl-1,2-epoxypentane, 2,4,4-trimethyl-2,3-epoxypentane, 1-phenyl-1,2-epoxypropane, 2-phenyl-1,2-epoxypropane, 1,2-epoxynonane, 1-phenyl-2-methyl-1,2-epoxypropane, 1-phenyl,2-epoxybutane, 4-phenyl-1,2-epoxybutane, 5-phenyl-1,2-epoxypentane, 1,2-epoxydecane, 1(p-tolyl)-1-methyl-3-phenyl-2,3-epoxybutane, 1-phenyl-2-ethyl-1,2-epoxybutane, 1-phenyl-2-methyl-1,2-epoxypentane, 1,2-epoxydodecane, 3-ethoxy-4-propyl-3,4-epoxy-heptane, 1,1-diphenyl-1,2-epoxypropane, 1,2-diphenyl-1,2-epoxypropane, 1,3-diphenyl-1,2-epoxypropane, 1-phenyl-2-(p-tolyl)-epoxyethane, 1-phenyl-1-(m-methoxyphenyl)-epoxyethane, 1-phenyl-1-(o-methoxyphenyl)-epoxyethane, 1'1-diphenyl-2-methyl-1,2-epoxypropane, 2,3-diphenyl-2,3-epoxybutane, 1,1-diphenyl-1,2-epoxybutane, 1,1-di(p-tolyl)-epoxyethane, 1,3-diphenyl-2-methyl-1,2-epoxypropane, 1-phenyl-2-benzyl-1,2-epoxypentane, 1-phenyl-2-benzyl-3-methyl-1,2-epoxybutane, 1,2-epoxyoctadecane, 9,10-epoxyoctadecane styrene oxide, cyclohexene oxide, methoxy and other alkoxy propylene oxides, epichlorohydrin, 3,3-dichloropropylene oxide, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichlorobutylene oxide. Generally when an alkylene oxide is used it will contain from 2 up to 18 carbon atoms.

The reaction of an oxide as an alkylene oxide with a basic nitrogen atom such as a tertiary amine is well known to those skilled in the art, and needs little elaboration. Therefore, when the dicarboxylic acid is present the carboxylate quaternary ammonium compound falling within the formula above is formed in a one-step process to produce the class of compounds found particularly useful here.

The reaction of tertiary amine, carboxylic acid, and oxide compound may be carried over a wide temperature range, say within 50°–200° C. If the oxide is an alkylene oxide in gas form such as ethylene oxide and propylene oxide at the above temperature, the reaction is preferably conducted in a closed vessel under pressure. The particular pressure employed is not critical and autogenous pressures are generally used.

In order to form the represented compounds the reactants must be present in at least a molar ratio of two moles each of alkylene oxide and tertiary amine with one mole of dicarboxylic acid. Of course, excesses of the oxide and amine may also be present to drive the reaction to completion. The excess oxide of course, adds to the terminal hydroxyl group to form repeating oxyalkylene units, so that n may range from 1 to 4 as an average number.

The catalysts of this invention are particularly advantageous over a seemingly similar catalyst in that they give a slower, more desirable reaction profile during polymer resin preparation and a more complete cure to the final product resin. The catalysts are particularly advantageous in this regard compared to catalysts of seemingly analogous chemical structure of the type described in the prior art cited here.

Thus, the catalysts of the invention are particularly useful in their delayed reaction rates and polymer forming reactions, have good compatibility and solubility in systems used, and are simply and easily prepared. Even more surprising, it was found that a high concentration of isocyanurate linkages are formed in the final polyisocyanurate polymer when yet only small amounts of catalyst are used.

The following examples illustrate preparation of typical compounds in the invention which have excellent activity as polyisocyanurate polymer catalysts. It is understood, of course, that these examples are merely illustrative and that the invention is not to be limited thereto.

EXAMPLE 1

To a 1500 ml. autoclave was added 202 g. (2.0 moles) triethylamine and 36 g. (2.0 moles) water. The mixture was stirred under nitrogen while 138 g. (1.0 mole) of oxydiacetic acid was added. The resulting salt solution was heated up to 75° C. under nitrogen and 132 g. (3.0 moles) ethylene oxide was added slowly, keeping the temperature <85° C. After a digestion period of one hour at 80°–85° C. the clave was vented and stripped in high vacuum to remove light material and give 374 g. of the product, a low boiling brown viscous liquid.

EXAMPLE 2

The procedure of Example 1 was repeated with the exception that 150 g. (1.0 mole) adipic acid was used in place of oxydiacetic acid. The final product was a clear, brown, viscous liquid. The yield was 367 g.

EXAMPLE 3

To the apparatus described in Example 1 was added 116 g. (1.0 mole) fumaric acid, 32 g (1.8 mole) water. And 101 g (1.0 mole) of triethylamine. The mixture was stirred while 66 g. (1.5 mole) ethylene oxide was added while keeping the temperature <85° C. After the addition, digestion was carried out at 80° C. The clave was vented after one hour and stripped in high vacuum to give the final product, a light-yellow viscous liquid. The yield was 215 g.

EXAMPLE 4

The procedure of Example 3 was repeated using 200 g (1.98 mole) triethylamine and 110 g. (2.5 mole) ethylene oxide. The final product was a dark-red, clear viscous liquid. Yield was 298 g. Analytical data was consistent with a bis quaternary ammonium salt structure.

EXAMPLE 5

To the apparatus described in Example 1 was added 200 g. (1.98 moles) triethylamine, 108 g. (6.0 moles) water and 126 g. (1.0 mole) oxalic acid dihydrate. The resulting salt mixture was heated to 60° C. under nitrogen and 132 g. (3.0 moles) ethylene oxide was slowly added. The reaction mixture was digested to constant pressure at 60°-70° C. and finally vented and stripped in high vacuum to give the final product, 298 g. of light-yellow viscous liquid. Analytical data confirmed a bis quaternary ammonium salt.

EXAMPLE 6

The procedure of Example 5 was repeated using 166 g. (1.0 mole) o-phthalic acid and 174 g. (4.0 moles) ethylene oxide. The product was a clear, yellow, viscous liquid. The yield was 410 g.

EXAMPLE 7

The procedure of Example 5 was repeated using 116 g. of maleic acid in place of oxalic acid. The product was a light-yellow viscous liquid. The yield was 460 g.

In order to prepare polymers containing recurring isocyanurate and urethane linkages or urethane-modified polyisocyanurate polymers, one reacts a polyol and an aromatic polyisocyanate utilizing one or more of the above isocyanurate formation catalysts or others described generally here.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-tolylene diisocyanate, 2,6-tolylene diisocyanate, dianisidine diisocyanate, bitolylene diisiocyanate, naphthalene-1,4-diisocyanate, diphenylene-4,4'-diisocyanate; aliphatic-aromatic diisocyanates, such as xylylene-1,4-diisocyanate, xylylene-1,3-diisocyanate, bis(4-isocyanatophenyl) methane, bis(3-methyl-4-isocyanatophenyl) methane, and 4,4'-diphenylpropane diisocyanate.

One class of aromatic polyisocyanates used in the practice of the invention are methylene-bridged polyphenyl polyisocyanate mixtures. These latter isocyanate compounds are generally produced by the phosgenation of corresponding methylene-bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,088; 3,444,162; and 3,352,979.

Most preferred methylene-bridged polyphenyl polyisocyanate mixtures used here contain from about 20 to about 100 weight percent methylene diphenyldiisocyanate isomers with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to 95 percent thereof is the 4,4' isomer, with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

Any conventional polyol such as a polyether or polyester polyol may be used in making the isocyanurate polymers here. Illustrative of these one can mention the following types:

(a) Polyalkylene polyols including the adducts of alkylene oxides with, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alphamethylglucoside, triisopropanolamine, ethylenediamine, diethylenetriamine, novolak resins, phosphoric acid, benzenephosphoric acid, polyphosphoric acids such as tripolyphosphoric acid and tetrapolyphosphoric acid, phenol-aniline-formaldehyde ternary condensation products, aniline-formaldehyde condensation products, and the like. The alkylene oxides employed in producing the polyoxyalkylene polyols normally have from 2 to 4 carbon atoms. Propylene oxide, ethylene oxide or mixtures of propylene oxide with ethylene oxide are preferred. It is known that the random or block structures can be obtained depending upon the particular known procedures used for their preparation.

(b) Polyesters of polyhydric alcohols and polycarboxylic acid such as those prepared by the reaction of an excess of ethylene glycol, propylene glycol, 1,1,1-trimethylolpropane, glycerol, or the like, with phthalic acid, adipic acid, and the like.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an amino-alcohol.

(d) Phosphorus-containing derivatives such as tris(dipropylene)glycol phosphite and other phosphites.

(e) The polymer/polyols produced by the in situ polymerization of a vinyl monomer in a polyol, as disclosed in U.S. Pat. Nos. 3,304,273, 3,383,351 and 3,523,093.

The foregoing are merely illustrative and represent only a small number of the many polyols known in the art that can be employed with the catalyst salts here used in the process of this invention.

The polyol or polyol mixture employed can have a hydroxyl number which can vary over a wide range. In general, the hydroxyl number of the polyols employed can range from about 20, and lower, to about 1000, and higher, preferably from about 20 to 800, and more preferably, from 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where, f = average functionality, that is, the average number of hydroxyl groups per molecule of polyol
OH = hydroxyl number of the polyol
M.W. = average molecular weight of the polyol The exact polyol employed depends upon the end-use of the polyisocyanurate polymer. For example, the molecular weight and the hydroxyl number can be selected properly to result in flexible, semi-flexible, semi-rigid or rigid foam products. The polyol preferably possesses a hydroxyl number of from about 200 to about 1000 when employed in rigid formulations, from about 50 to about 250 for semi-flexible foams, and from about 20 to 70 or more when employed in flexible foam formulations. Such limits are not intended to be restrictive, but are merely illustrative of the large number of possible combinations of the polyols that can be employed.

Greatly preferred polyether or polyester polyols have a hydroxyl number within a range of from about 100 to about 500, and a molecular weight from about 100 to about 1000.

Foaming is accomplished by employing in a minor amount (for example, from about 0.5 to 25 weight percent, based on total weight of the reaction mixture), of blowing agents which are vaporized by the exotherm of the isocyanato-reactive hydrogen reaction. The preferred blowing agents are certain halogen-substituted aliphatic hydrocarbons which have boiling points between about 40° C. and 70° C., and which vaporize at or below the temperature of the foaming mass. The blowing agents include, for example, trichloromonofluoromethane, dichlorodifluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2-chloro-1,1,1,2,3,-3,4,4,-nonafluorobutane, hexafluorocyclobutene, and octafluorocyclobutane. Other useful blowing agents include water and low-boiling hydrocarbons such as butane, pentane, hexane, cyclohexane, and the like. Many other compounds easily volatilized by the exotherm of the isocyanatoreactive hydrogen reaction also can be employed. A further class of blowing agents includes the thermally unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

In addition to the above disclosed catalysts an additional isocyanurate group formation catalyst to promote trimerization may also be employed or other catalysts used to promote polyurethane formation. Such catalysts include strong bases, alkali metal salts of carboxylic acids, non-basic metal salts of carboxylic acids and aliphatic tertiary amines. For example, suitable strong bases include quaternary ammonium hydroxides. Suitable alkali metal salts of carboxylic acids include, for example, sodium acetate, potassium octoate, potassium acetate, sodium benzoate, and the like. Examples of suitable tertiary amines are N,N'-diethylpiperazine, N,N'-dimethylpiperazine, trialkylamines such as trimethylamine, triethylenediamine, tributylamine, 2,4,6-tris(dimethylaminomethyl)phenol, and N,N',N''-tris(dimethylaminopropyl)hexhydro-s-triazine and the like.

The particular amount of the diquaternary ammonium carboxylate catalyst employed can vary over a wide range and is not critical so long as it is present in amounts sufficient to promote trimerization of the isocyanatepolyol mixture. Preferably the catalyst is added in an amount of 1–10 percent by weight of catalyst based on the weight of the polymer system such as cellular foam system. More often, the catalyst is most preferably added in an amount of from 2 percent up to about 8 percent by weight, based on the total polymer or foam formulation weight.

If desirable, the isocyanurate polymers such as foams of the invention can be formulated to include flame retardant components to improve the fire retardancy of the foams. Any known fire retardant component compatible with isocyanurate foams can be employed. This would include both the reactive and additive type fire retardants. Representatives of the additive types include halogenated organic phosphates such as tris(chloroethyl)phosphate, tris(2,3-dibromopropyl) phosphate, triphenyl phosphite, diammonium phosphate, and antimony oxide. Representatives of the chemically bound types are diethyl-N,N-bis(2-hydroxyethyl)aminomethyl phosphonate, chlorendic acid derivatives, and phosphorous-containing polyols. When employed, the fire retardant component is added to the above-described isocyanate mixture with some other component or as a preformed mixture with some other component described hereinbefore, in an amount of about 1 to about 20 weight percent of the total foam formulation.

Furthermore, fillers can be employed in the preparation of the isocyanurate polymers, if desired in amounts within the range of about 0.1 to about 20 weight percent of the total polymer formulation. Any conventional filler known in the art to be compatible with isocyanurate polymer manufacture can be employed, such as hydrated alumina, polyethylene, aluminum powder, and various clays and talcs.

An emulsifier or stabilizing agent may also be used in the preparation of the isocyanurate foams of this invention including, for example, sulfonated castor oil or the like. One preferred foam stabilizer is that based on silicone such as, for example, a polydimethyl siloxane or a polyoxyalkylene block copolymer of a silane. The latter type of silicone oil is disclosed in U.S. Pat. No. 2,834,748. Other surfactants or emulsifying or dispersing agents which may be used include ethylene oxide modified sorbitan or monopalmitate or ethylene oxide modified polypropylene ether glycol.

The amount of polyol employed in relation to the organic aromatic polyisocyanate is not critical, but preferably ranges in an amount of from about 0.1 to about 0.8 equivalents per equivalent of polyisocyanate. Optimally, about 0.2 to about 0.6 equivalents per equivalent of polyisocyanate is employed. Moreover, the polyol can be added to the polyisocyanate as a separate component or as a preformed mixture with one or more of the other components.

To prepare isocyanurate foams, the above discussed ingredients may be simultaneously, or independently intimately mixed with each other by the so-called "one-shot" method to provide a foam by a one-step process. Proportions of ingredients are properly adjusted to give flexible, rigid, semi-flexible or semi-rigid foams. In preparing flexible foams usually water is also employed as part of the blowing agent. In addition to the "one-shot" method the "quasi-prepolymer method" may also be employed. Here, a portion of the polyol is reacted in the absence of a catalyst with the polyisocyanate component. Thereafter to prepare a suitable foam, the remaining portion of the polyol is added and the reaction allowed to go to completion in the presence of catalyst along with other appropriate additives such as blowing agents, foam stabilizing agents, fire retardants, etc.

Results of the rigid foam preparation using the catalyst of Examples 1-5 are given below in Table I.

TABLE I

| | EXAMPLES | | | | |
|---|---|---|---|---|---|
| | 8 | 9 | 10 | 11 | 12 |
| Formulation, pbw. | | | | | |
| THANOL TR-380 | 19.0 | 19.0 | 19.5 | 19.0 | 19.0 |
| Silicone DC-193 | 0.5 | 0.5 | 0.5 | 0.5 | 0.5 |
| R-11-B | 12.5 | 12.5 | 12.5 | 12.5 | 12.5 |
| Catalyst of Example 1 | 1.0 | — | — | — | — |
| Catalyst of Example 2 | — | 1.0 | — | — | — |
| Catalyst of Example 3 | — | — | 0.5 | — | — |
| Catalyst of Example 4 | — | — | — | 1.0 | — |
| Catalyst of Example 5 | — | — | — | — | 1.0 |
| isocyanate Index | 5.0 | 5.0 | 5.0 | 5.0 | 5.0 |
| Mixing Time 1 sec. | 6 | 4 | 10 | 5 | 10 |
| Cream Time 1 sec. | 15 | 5 | 120 | 18 | 23 |
| Tack Free Time 1 sec. | 50 | 10 | — | 26 | 35 |
| Rice Time 1 sec. | 85 | 18 | — | 41 | 57 |
| Foam Appearance | Fair | Good | Poor | Good | Good |
| Initial Surface Friability | None | Yes | Yes | Slight | Slight |
| Density lb./ft. 3 | 1.97 | 2.30 | — | — | — |
| K-Factor | 0.136 | 0.122 | — | — | — |
| Compressive strength, psi w rise | 29.7 | 48.0 | — | — | — |
| Compressive strength, psi x rise | 15.4 | 17.9 | — | — | — |
| Heat Distortion (°C.) | >225 | >225 | — | — | — |
| % Closed Cells | 89.7 | 93.7 | — | — | — |
| Butler Chimney Flame ht. (in) | 6.83 | 6.0 | — | — | — |
| Butler Chimney % wt. Retained | 93.1 | 95.1 | — | — | — |
| Dimensional Stability, ΔV | — | — | — | — | — |
| 158° F., 100% RH, 1 week | +3 | +2 | — | — | — |
| 200° F., Dry, RH, 1 week | +3 | +1 | — | — | — |
| −20° F., Dry, RH, 1 week | −4 | −2 | — | — | — |
| Friability (% Wt. Loss) | 36 | 20 | — | — | — |

Again, isocyanurate polymers may be prepared over a wide range of temperatures. However, normally, the reaction is initiated at room temperature, and the only heat involved is that generated by the polymerization itself.

The polyurethane-modified polyisocyanurate compositions may be useful in the preparation of foams, adhesives, binders, laminates, coating, and elastomers of various types. When foams are prepared they may be used as thermal insulation and as building materials and the like.

The diquaternary ammonium carboxylates prepared were then treated for their activity as catalyst in preparing rigid polyisocyanurate foams. These foams were prepared using formulations shown in Table I. The polyol, catalyst, surfactant and blowing agent were mixed well in the small stoppered bottle to provide the "B" component. The "A" component consisted of a polyisocyanate, which in all cases was Mondur ® MR. This polyisocyanate is a mixture of polyaryl isocyanates containing methylenediphenyl diisocyanate and higher functional isocyanates. THANOL ® TR-380 polyol is a 6.5 mole ethylene oxide adduct of aniline. Freon R-11-B is a trifluorochloromethane blowing agent available from Du Pont Silicone DC-193, is a surfactant available from Dow Corning which is a silicone-glycol copolymer.

The A and B components were combined in a 2:1 weight ratio and mixed well for 5-15 seconds in a metal can with a high speed stirrer. The mixture was then allowed to rise in the can or poured into a square cardboard box. Measurements were taken during the procedure of cream time, tack-free time and rise time. In cases where foam properties are shown, 600 grams of the foams were cured for 48 hours before cutting the specimens for testing.

We claim:

1. In a process for preparing a polymer containing recurring isocyanurate and urethane linkages, which polymer comprises the reaction product of a polyol and an aromatic polyisocyanate, while utilizing an isocyanurate group formation catalyst; the improvement which comprises employing as said isocyanurate catalyst a quaternary ammonium carboxylate salt which comprises a compound falling within the following structural formula:

$$^{\ominus}O-\overset{O}{\overset{\|}{C}}(R)\overset{O}{\overset{\|}{C}}-O^{\ominus}\left(\overset{R_1}{\underset{R_2}{\overset{\oplus}{N}}}\overset{}{\underset{R_3}{-}}(CH_2-\underset{R_4}{\overset{}{C}}HO)_n-H\right)_2$$

where $R_1$, $R_2$ and $R_3$ individually are radicals selected from the group consisting of alkyl, or substituted alkyl, $R_4$ is a radical substituted from the group consisting of alkyl, substituted alkyl or hydrogen, R is a radical selected from the group consisting of $-(CH_2)_x$,

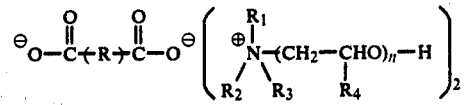

, $-CH_2OCH_2-$, $-CH=CH-$, $-C\equiv C-$,

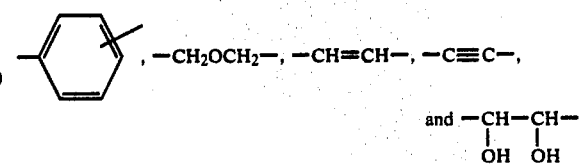

and x is a number of from 0 to 20 and n is a number of from 1 to 4.

2. The process of claim 1 wherein said polyol is a polyether or polyester polyol.

3. The process of claim 1 wherein said polymer is a cellular polymer obtained by reacting said polyol and said polyisocyanate in presence of a blowing agent.

4. The process of claim 3 wherein a rigid polyisocyanurate foam is produced.

5. The process of claim 1 where R is $-CH_2OCH_2-$.

6. The process of claim 1 where R is $-CH_2-_x$ and x is 2 or 6.

7. The process of claim 1 where R is $-C{\equiv}C-$.

8. The process of claim 1 where R is $-C{=}C-$.

9. The process of claim wherein R is

10. A polyisocyanurate catalyst compound having a structural formula as follows:

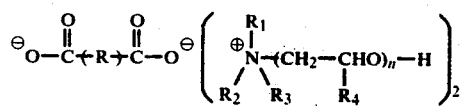

where $R_1$, $R_2$ and $R_3$ individually are radicals selected from the group consisting of alkyl, or substituted alkyl, $R_4$ is a radical substituted from the group consisting of alkyl, substituted alkyl or hydrogen, R is a radical selected from the group consisting of $-(CH_2)-_x$,

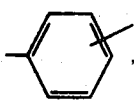

, $-CH_2OCH_2-$, $-CH{=}CH-$, $-C{\equiv}C-$, and 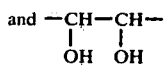

and x is a number of from 0 to 20 and n is a number of from 1 to 4.

11. The compound of claim 10 where R is $-CH_2OCH_2-$.

12. The compound of claim 10 where R is $-CH_2-_x$ and x is 2 or 6.

13. The compound of claim 10 where R is $-C{\equiv}C-$.

14. The compound of claim 10 where R is $-CH{=}CH-$.

15. The compound of claim 10 where R is

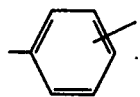

* * * * *